(12) United States Patent
Ali et al.

(10) Patent No.: US 11,099,827 B2
(45) Date of Patent: Aug. 24, 2021

(54) NETWORKING-DEVICE-BASED HYPER-COVERGED INFRASTRUCTURE EDGE CONTROLLER SYSTEM

(71) Applicant: Dell Products L.P., Round Rock, TX (US)

(72) Inventors: Rizwan Ali, Cedar Park, TX (US); Ravikanth Chaganti, Karnataka (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 16/653,637

(22) Filed: Oct. 15, 2019

(65) Prior Publication Data

US 2021/0109735 A1 Apr. 15, 2021

(51) Int. Cl.
*G06F 9/44* (2018.01)
*G06F 8/65* (2018.01)
*H04L 12/24* (2006.01)

(52) U.S. Cl.
CPC .............. *G06F 8/65* (2013.01); *H04L 41/082* (2013.01); *H04L 41/0866* (2013.01); *H04L 41/0886* (2013.01)

(58) Field of Classification Search
None
See application file for complete search history.

(56) References Cited

U.S. PATENT DOCUMENTS

| | | | | |
|---|---|---|---|---|
| 10,469,318 | B1* | 11/2019 | Parthasarathy | H04L 67/34 |
| 10,476,951 | B2* | 11/2019 | Gakhar | H04L 43/16 |
| 2004/0006652 | A1* | 1/2004 | Prall | G06F 9/542 |
| | | | | 719/318 |
| 2015/0082016 | A1* | 3/2015 | Bonczkowski | G06F 9/44505 |
| | | | | 713/100 |
| 2016/0188370 | A1* | 6/2016 | Razin | G06F 11/3495 |
| | | | | 718/104 |
| 2018/0287912 | A1* | 10/2018 | Zabarsky | G06F 3/0635 |
| 2018/0293066 | A1* | 10/2018 | Ali | G06F 9/4411 |
| 2019/0340005 | A1* | 11/2019 | Mace | G06F 3/061 |
| 2020/0133657 | A1* | 4/2020 | Yan | G06F 3/064 |
| 2020/0177444 | A1* | 6/2020 | Nelson-Gal | H04L 41/082 |
| 2020/0272452 | A1* | 8/2020 | Delange | H04L 67/34 |
| 2020/0278859 | A1* | 9/2020 | Olderdissen | G06F 9/45558 |
| 2020/0351333 | A1* | 11/2020 | Gill | G06F 9/45558 |
| 2021/0019093 | A1* | 1/2021 | Karr | G06F 3/0647 |

* cited by examiner

*Primary Examiner* — Insun Kang
(74) *Attorney, Agent, or Firm* — Haynes and Boone, LLP

(57) ABSTRACT

A networking-device-based HCI edge controller system includes a networking device coupled to a master controller system via a network, as well as locally to an HCI node system including HCI node(s). The networking device and the HCI node system are provided at an edge location in a network, and the networking device operates to identify HCI node components that are included in the HCI node(s) in the HCI node system, and retrieve respective software inventory information for each of the HCI node component in the HCI node(s). The networking device receives first updated software from the master controller system via the network, determines that the respective software inventory information for at least one of the HCI node components does not comply with the first updated software for those HCI node components and, in response, provides the first updated software on those HCI node components.

20 Claims, 9 Drawing Sheets

NETWORKING-DEVICE-BASED HYPER-COVERGED INFRASTRUCTURE EDGE CONTROLLER SYSTEM

BACKGROUND

The present disclosure relates generally to information handling systems, and more particularly to a networking-device-based controller for a Hyper-Converged Infrastructure (HCI) information handing system located at a network edge.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided via a Hyper-Converged Infrastructure (HCI) system, which is a software-defined Information Technology (IT) infrastructure that virtualizes elements of conventional "hardware-defined" systems, and may be provided by virtualized computing (e.g., via a hypervisor), a virtualized Storage Area Network (SAN) (e.g., software-defined storage), and in some situations virtualized networking (e.g., storage defined networking), any or all of which may be provided using commercial "off-the-shelf" server devices. HCI systems are rapidly replacing legacy infrastructure that uses separate physical server devices, storage devices, and networking devices, and are also being implemented in a variety of new use cases. For example, it is becoming more and more common to deploy HCI systems at the edge of a network (e.g., remote business locations that are at the "edge" of the network utilized by a business), a trend which is expected to continue with the adoption of 5G wireless networks.

In many situations, HCI systems that are deployed at a network edge are provided by storage-dense HCI server "nodes" or "building blocks" that are clustered together in the remote business location, and one of skill in the art in possession of the present disclosure will recognize that the lifecycle management for such HCI systems can be relatively important. Conventional HCI systems allow for centralized monitoring (e.g., from a centralized location via the network), but the updating of HCI system components typically requires a dedicated, independent management server device or workstation that is available locally at each remote business location in order to host and carry out update operations (e.g., while it is possible to remotely orchestrate such update operations from a centralized location, doing so requires guaranteed, always-on connectivity with the remote business location that is often lacking at a network edge, and thus local update operations tend to be preferred.) However, such additional management infrastructure to manage HCI system component updates is typically something that most businesses are unwilling to provide for their remote business locations due to cost, maintenance, and/or other remote computing issues known in the art. Furthermore, even when a single management server or workstation is provided at the remote business location, it becomes a single point of failure for HCI system management/update operations.

Accordingly, it would be desirable to provide a controller for an HCI system at a network edge that addresses the issues discussed above.

SUMMARY

According to one embodiment, an Information Handling System (IHS) includes a networking processing system; and a networking memory system that is coupled to the networking processing system and that includes instructions that, when executed by the networking processing system, cause the networking processing system to provide an edge controller engine that is configured to: identify a plurality of HCI node components that are included in at least one HCI node in an HCI node system that is coupled to the processing system; retrieve, from the at least one HCI node in the HCI node system, respective software inventory information for each of the plurality of HCI node components; receive, from a master controller system via a network, first updated software; and determine that the respective software inventory information for at least one of the plurality of HCI node components does not comply with the first updated software for that at least of the plurality of HCI node components and, in response, provide the first updated software on that at least one of the plurality of HCI node components.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
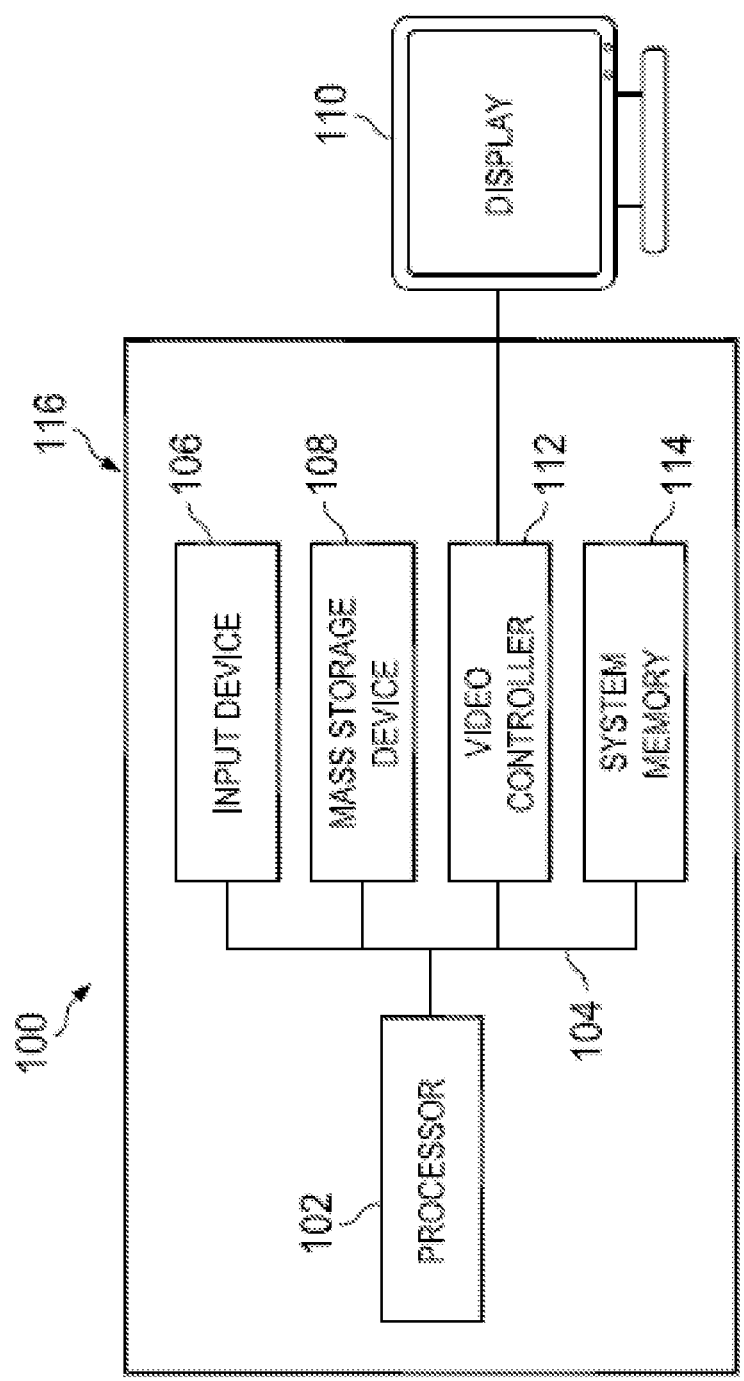
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
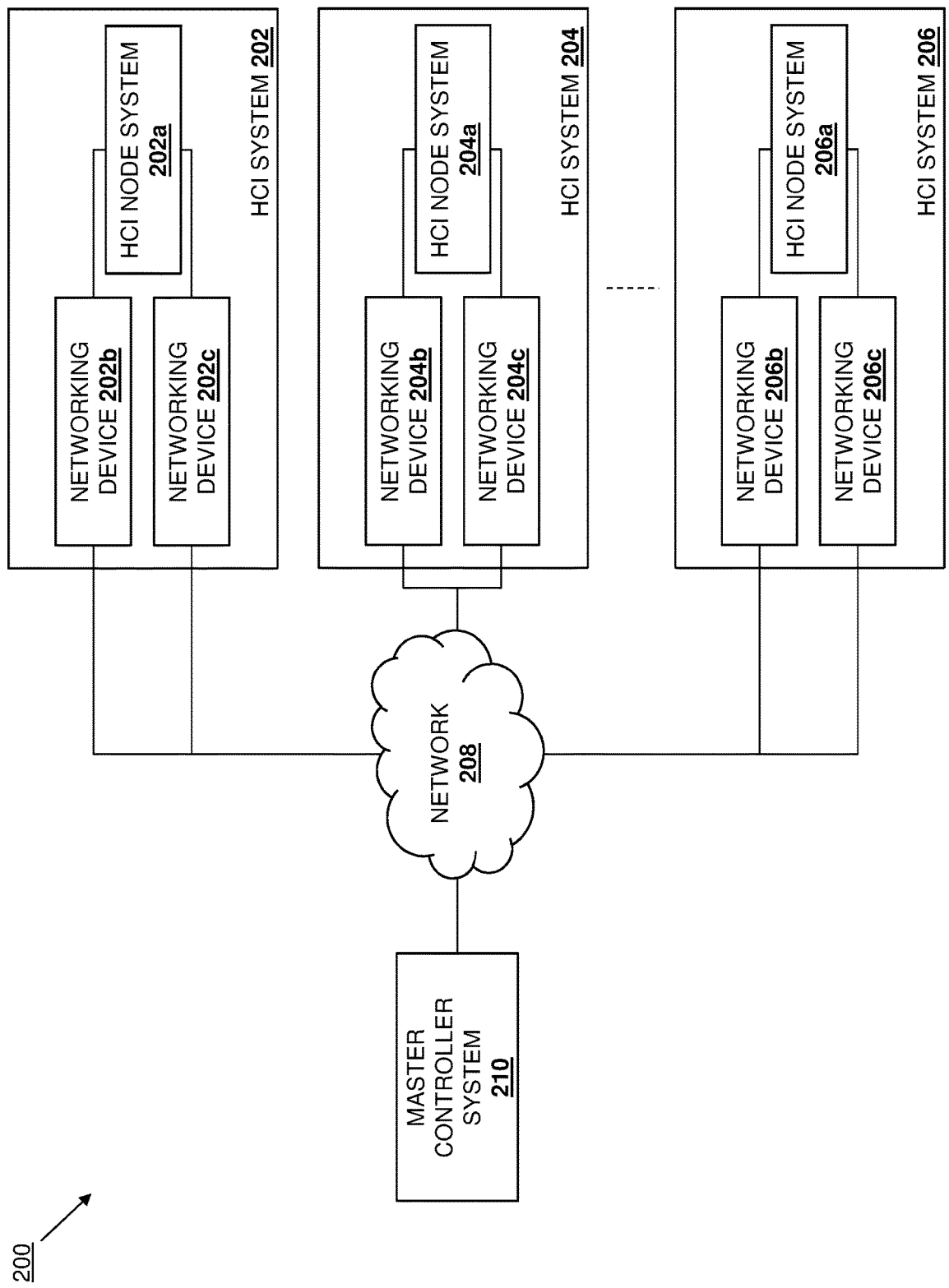
FIG. 2 is a schematic view illustrating an embodiment of a networking-device-based HCI edge controller system.

Referring now to FIG. 2, an embodiment of a networking-device-based HCI edge controller system 200 is illustrated. In the illustrated embodiment, the networking-device-based HCI edge controller system 200 includes a plurality of HCI systems 202, 204, and up to 206. As will be appreciated by one of skill in the art in possession of the present disclosure, the HCI systems 202, 204, and up to 206 may be considered edge-based HCI systems due to those HCI systems being located at the edge of a business network (e.g., located at an remote location for the business) and/or including other edge-based HCI characteristics that would be apparent to one of skill in the art in possession of the present disclosure. In a specific example, as discussed below, an edge-based HCI system is typically provided by 2-4 HCI node clusters that are placed in multiple remote locations such as retail/convenience stores, manufacturing or distribution centers, remote/branch offices, and/or or other remote locations known in the art. The purpose of such edge-based HCI systems is often to provide an easy to manage HCI system to provide local computation services and associated storage required at these remote/edge locations such as, for example, performing real time video analytics enabled by local HCI systems to analyze video, store that video locally, and report any detected anomalies upstream to a central monitoring system. In an embodiment, each of the HCI systems 202, 204, and up to 206 may be provided by the IHS 100 discussed above with reference to FIG. 1, and/or may include some or all of the components of the IHS 100. In the illustrated embodiment, each of the HCI systems in the networking-device-based HCI edge controller system 200 includes an HCI node system coupled to a pair of networking devices.

For example, the HCI system 202 includes an HCI node system 202a (typically provided by multiple HCI nodes) coupled to a pair of networking devices 202b and 202c; the HCI system 204 includes an HCI node system 204a (typically provided by multiple HCI nodes) coupled to a pair of networking devices 204b and 204c; and the HCI system 206 includes an HCI node system 206a (typically provided by multiple HCI nodes) coupled to a pair of networking devices 206b and 206c. In some embodiments, the HCI node systems 202a, 204a, and 206a may each be provided by the IHS 100 discussed above with reference to FIG. 1, and/or may include some or all of the components of the IHS 100. In specific examples, the HCI node systems 202a, 204a, and 206a may each be provided by a plurality of (e.g., 2-4) HCI nodes (e.g., storage-dense server devices) configured in a Hyper-Converged Cluster, although other types and configurations of HCI nodes will fall within the scope of the present disclosure as well. In some embodiments, the networking device pairs 202b/202c, 204b/204c, and 206b/206c may each be provided by the IHS 100 discussed above with reference to FIG. 1, and/or may include some or all of the components of the IHS 100.

In specific examples, the networking device pairs 202b/202c, 204b/204c, and 206b/206c may be provided by a pair of ½ width switch devices that provide a highly available HCI system, although other types and configurations of networking device(s) will fall within the scope of the present disclosure as well. As will be appreciated by one of skill in the art in possession of the present disclosure, the networking devices/switch devices in the HCI systems 202, 204, and up to 206 may perform a variety of conventional networking operations (e.g., providing for the transmission of data traffic between the HCI node system 204a and devices connected to the networking devices/switch devices via a network) in addition to the edge controller functionality discussed below. Furthermore, each of the HCI systems 202, 204, and up to 206 may (and typically will) be provided in different geographic locations, although the HCI systems 202, 204, and up to 206 may all be provided as separate entities in a single location (e.g., in a multi-story building with one HCI system on each floor) while remaining within the scope of the present disclosure as well. Further still, while only three HCI systems are illustrated, one of skill in the art in possession of the present disclosure will appreciate that many more instances of HCI systems will fall within the scope of the present disclosure as well.

For example, each of the HCI systems 202, 204, and 206 may include 4 storage-dense server devices that make up its respective HCI node system 202a, 204a, and 206a, which may be provided by DELL EMC® VxRAIL Appliances available from DELL® Inc. of Round Rock, Tex., United States; DELL EMC® XC Series Appliances available from DELL® Inc. of Round Rock, Tex., United States; DELL EMC® vSAN Ready Nodes available from DELL® Inc. of Round Rock, Tex., United States; DELL EMC® VxFlex Ready Nodes available from DELL® Inc. of Round Rock, Tex., United States; MICROSOFT® Storage Spaces Direct Ready Nodes available from MICROSOFT® Corporation of Redmond, Wash., United States; and/or other HCI nodes that would be apparent to one of skill in the art in possession of the present disclosure. Furthermore, each of the HCI systems 202, 204, and 206 may include 2½ width switch devices providing its respective networking device pairs 202b/202c, 204b/204c, and 206b/206c, which may be provided by S series ½ width switch devices (e.g., the 10 GbE S4112 switch device and/or the 25 GbE S5212 switch device) available from DELL® Inc. of Round Rock, Tex., United States, as well as any other switch devices that would be apparent to one of skill in the art in possession of the present disclosure.

As will be appreciated by one of skill in the art in possession of the present disclosure, the use of a pair ½ width switch devices as the networking device pairs 202b/202c, 204b/204c, and 206b/206c in the HCI systems 202, 204, and 206, respectively, provides relatively small form-factor, highly available, HCI systems with two fully redundant switch devices in a 1U space/rack slot on a rack, with those switch devices able to support the needs of 2-4 storage-dense server devices that provide the HCI node systems 202a, 204a, and 206a, respectively. For example, a pair of the 10 GbE S4112 switch devices mentioned above provided with four storage dense server devices configured in a Hyper-Converged Cluster will include a sufficient number of ports to provide a dedicated storage fabric, a dedicated management/Virtual Machine (VM) fabric), as well as connections to an Out-Of-Band (OOB) network.

Each of the HCI systems 202, 204, and up to 206 may be coupled to a network 208 that may be provided by a Local Area Network (LAN), the Internet, and/or any other networks that would be apparent to one of skill in the art in possession of the present disclosure. For each example, as illustrated, each networking device in the networking device pairs 202b/202c, 204b/204c, and 206b/206c may include respective connections to the network 208. Furthermore, a master controller system 210 is coupled to the network 208. In some embodiments, the master controller system 210 may be provided by the IHS 100 discussed above with reference to FIG. 1, and/or may include some or all of the components of the IHS 100. In specific examples, the master controller system 210 may be provided by one or more server devices, although other master controller devices will fall within the scope of the present disclosure as well. While specific examples of a networking-device-based HCI edge controller system 200 has been illustrated and described, one of skill in the art in possession of the present disclosure will recognize that the networking-device-based HCI edge controller system of the present disclosure may include a variety of components and component configurations while remaining within the scope of the present disclosure as well.

Figure 3:
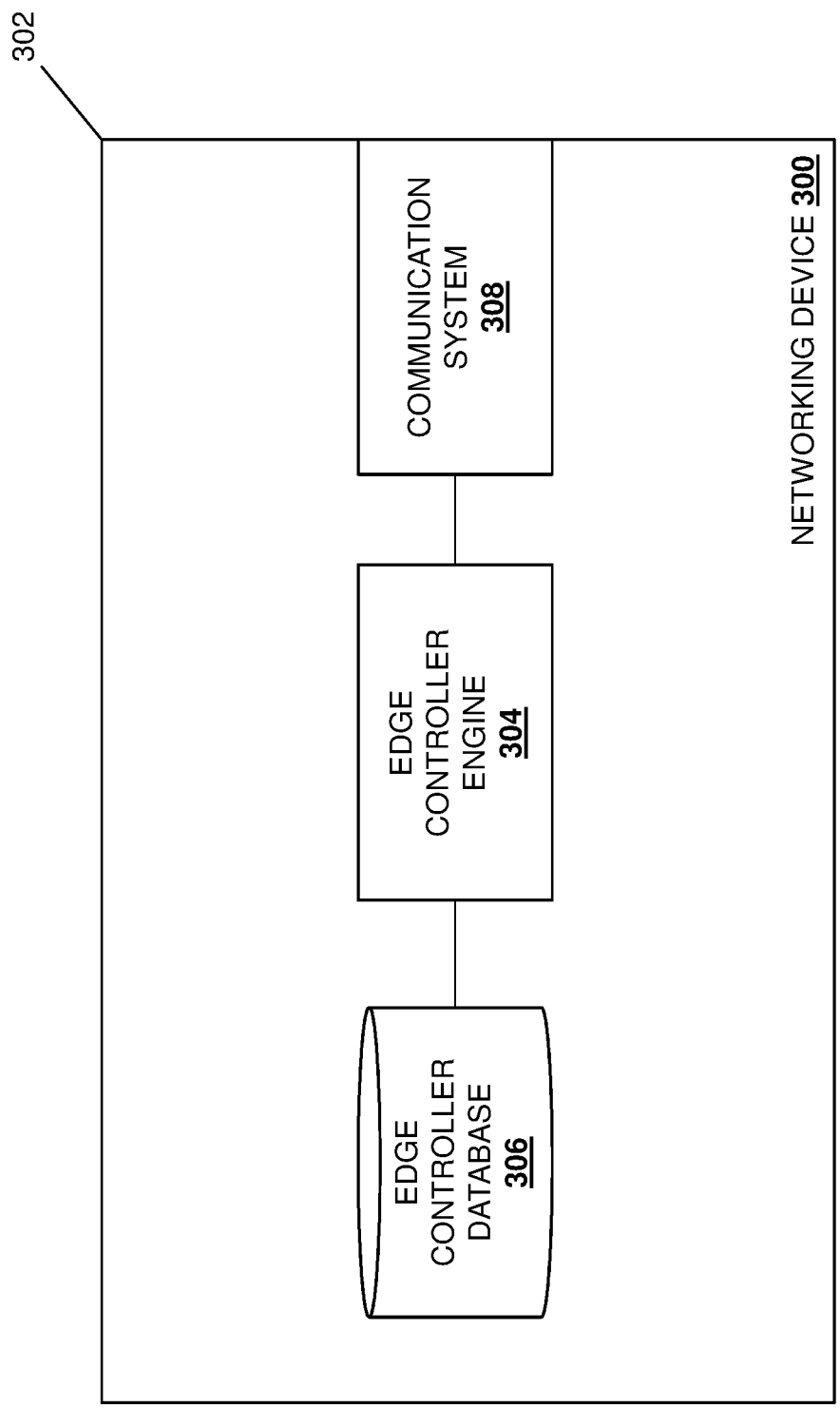
FIG. 3 is a schematic view illustrating an embodiment of a networking device that may be included in the networking-device-based HCI edge controller system of FIG. 2.

Referring now to FIG. 3, an embodiment of a networking device 300 is illustrated that may provide any of the networking devices 202b, 202c, 204b, 204c, 206b, and 206c discussed above with reference to FIG. 2. As such, the networking device 300 may be provided by the IHS 100 discussed above with reference to FIG. 1 and/or may include some or all of the components of the IHS 100. Furthermore, while discussed as a ½ width switch device, one of skill in the art in possession of the present disclosure will recognize that the functionality of the networking device 300 discussed below may be provided by other devices that are configured to operate similarly as discussed below. In the illustrated embodiment, the networking device 300 includes a chassis 302 that houses the components of the networking device 300, only some of which are illustrated below. For example, the chassis 302 may house a networking processing system (not illustrated, but which may include the processor 102 discussed above with reference to FIG. 1) and a networking memory system (not illustrated, but which may include the memory 114 discussed above with reference to FIG. 1) that is coupled to the networking processing system and that includes instructions that, when executed by the networking processing system, cause the networking processing system to provide an edge controller engine 304 that is configured to perform the functionality of the edge controller engines and/or networking devices discussed below, as well as the conventional networking operations discussed above for its connected HCI node system.

The chassis 302 may also house a storage system (not illustrated, but which may include the storage 108 discussed above with reference to FIG. 1) that is coupled to the edge controller engine 304 (e.g., via a coupling between the storage system and the processing system) and that includes an edge controller database 306 that is configured to store any of the information utilized by the edge controller engine 304 discussed below. The chassis 302 may also house a communication system 308 that is coupled to the edge controller engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality (e.g., the conventional networking operations discussed above), as well as the functionality discussed below, while remaining within the scope of the present disclosure as well.

Figure 4:
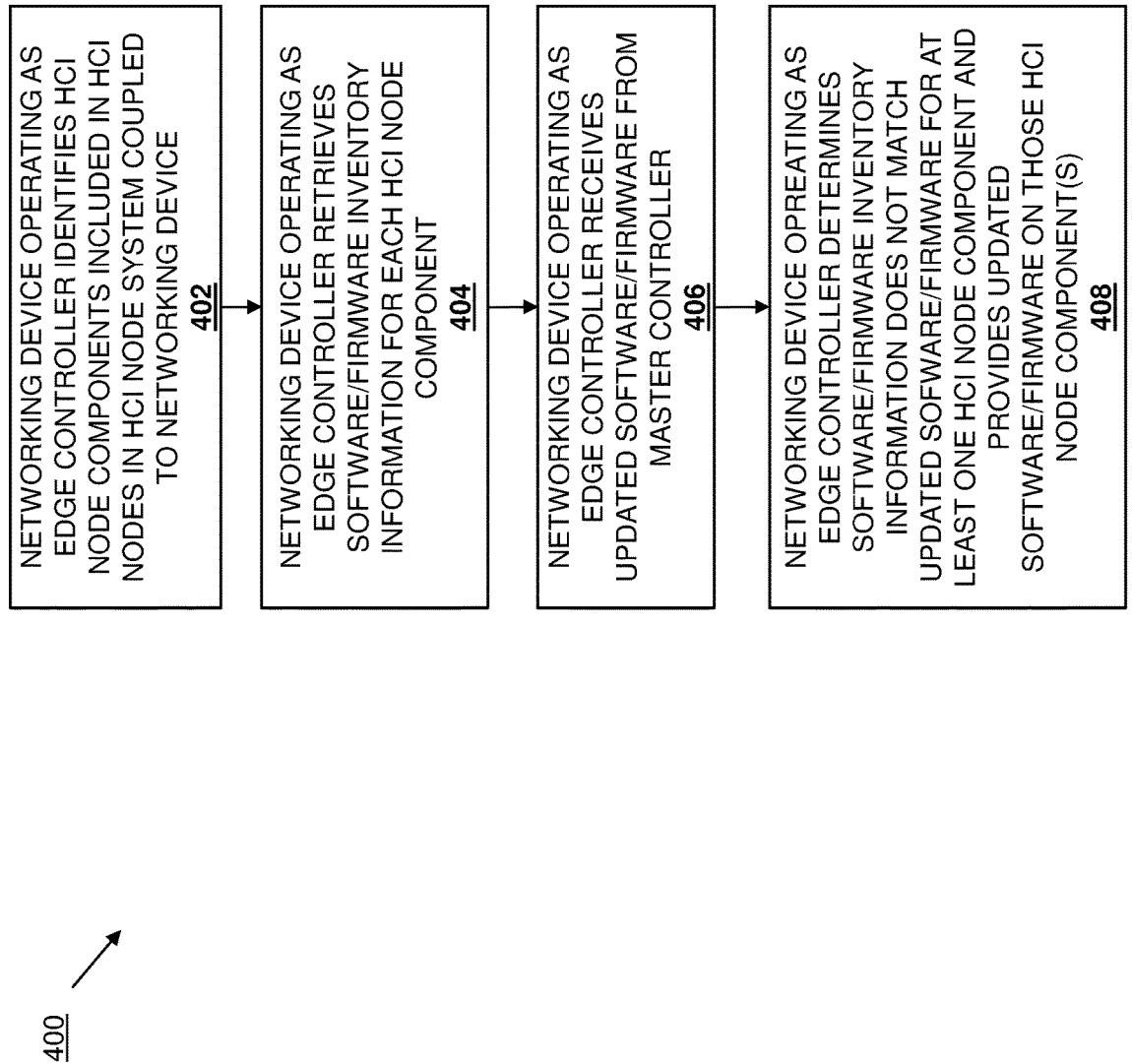
FIG. 4 is a flow chart illustrating an embodiment of a method for providing networking-device-based control of an HCI system at a network edge.

Referring now to FIG. 4, an embodiment of a method 400 for providing networking-device-based control of an HCI system at a network edge is illustrated. As discussed below, the systems and methods of the present disclosure provide an edge controller system in one or more networking devices provided with an edge HCI system, with the edge controller system operating in conjunction with a master controller system that is accessible via a network (e.g., in a datacenter, private cloud system, public cloud system, etc.) Edge controller systems provided for any edge HCI system may register with the master controller system during times when the two have network connectivity, but the network connectivity between the edge controller system and the master controller system need not be persistent, and in many embodiments may be intermittent. The master controller system manages the edge HCI systems and the compliance of HCI components in the edge HCI systems with HCI component updates via the edge controller system included in the networking device(s) provided with each edge HCI system.

For example, if an edge HCI system includes an HCI node system with identical HCI node devices (e.g., VxRail HCI node devices with standard HCI components/hardware that do not change), the master controller system may periodically provide HCI component updates to the edge controller system, and the edge controller system may then provide those HCI component updates to those HCI components/ hardware. However, in examples in which an edge HCI system includes an HCI node system with different HCI node devices or flexible, non-appliance HCI node devices (e.g., vSAN-ready HCI node devices), then the edge controller system may provide the master controller system a manifest of the inventory of HCI node devices/HCI components/hardware in its HCI system, which allows the master controller system to match the manifest to HCI component update(s) for any HCI node device/HCI component/hardware that requires such updates, and provide those HCI component updates to the edge controller system for provisioning to the HCI node devices/HCI components/ hardware in its HCI system. As such, edge HCI system management is enabled without the additional management infrastructure needed with conventional edge HCI systems, reducing costs, maintenance, and other remote computing issues known in the art, while redundant edge controller systems may be included in respective pairs of switch devices provided with an edge HCI system in some embodiments to prevent a single point of failure for HCI system management/update operations.

The method 400 begins at block 402 where a networking device operating as an edge controller identifies HCI node components included in HCI nodes in an HCI system coupled to that networking device. In an embodiment, at or prior to block 402, an edge controller engine 304 in a networking device 300 may be elected as an active edge controller. For example, with reference to the edge HCI system 204 discussed in the examples below, each of the networking devices 204b and 204c may include respective edge controller engines 304 that are configured to provide an edge control plane for the HCI node system 204a and HCI system 204, and those edge controller engines may be configured to communicate to elect one of those edge controller engines as an active edge controller, and the other as a passive edge controller. In a specific example, the networking devices 204b and 204c may be connected to each other via a link aggregation (e.g., a VLT link aggregation), and in response to detecting that link aggregation, each of the edge controller engines 304 in the networking devices 204b and 204c may operate to elect one of the edge controller engines 304 as an active edge controller (e.g., the edge controller engine 304 in the networking device 204b in the examples below), and the other of the edge controller engines 304 as a passive edge controller (e.g., the edge controller engine 304 in the networking device 204c in the examples below). While not discussed below in detail, one of skill in the art in possession of the present disclosure will recognize how a passive edge controller may take over edge controller operations for an active edge controller in the event the active edge controller becomes unavailable, thus providing for redundancy and high availability in the control of the edge HCI system 204.

In an embodiment, at block 402, the edge controller engine 304 in the networking device 204a may operate to discover the HCI node device(s) in the HCI node system 204a that are connected to the ports (e.g., provided by the communication system 310) on the networking device 204a/ 300. For example, at block 402 the edge controller engine 304 in the networking device 204a may utilize out-of-band communications via an out-of-band channel with a management subsystem (e.g., an DELL® Remote Access Controller (iDRAC) available from DELL® Inc. of Round Rock, Tex., United States) provided for that HCI node device in order to discover that HCI node device. However, as will be appreciated by one of skill in the art in possession of the present disclosure, an out-of-band channel utilized for the out-of-band communications with the management subsystem discussed above may not be configured in some situations. In such situations, at block 402 the edge controller engine 304 in the networking device 204a may utilize in-band communications via a service module (e.g., an iDRAC Service Module (iSM)) running on an operating system in each HCI node device in the HCI node system 204a and through an "always-on" in-band channel to a management subsystem (e.g., an iDRAC available from DELL® Inc. of Round Rock, Tex., United States) provided for that HCI node device in order to discover that HCI node device. However, while a few specific examples of HCI node device discovery have been described, one of skill in the art in possession of the present disclosure will recognize that other HCI node device discovery techniques will fall within the scope of the present disclosure as well.

Figure 5A:
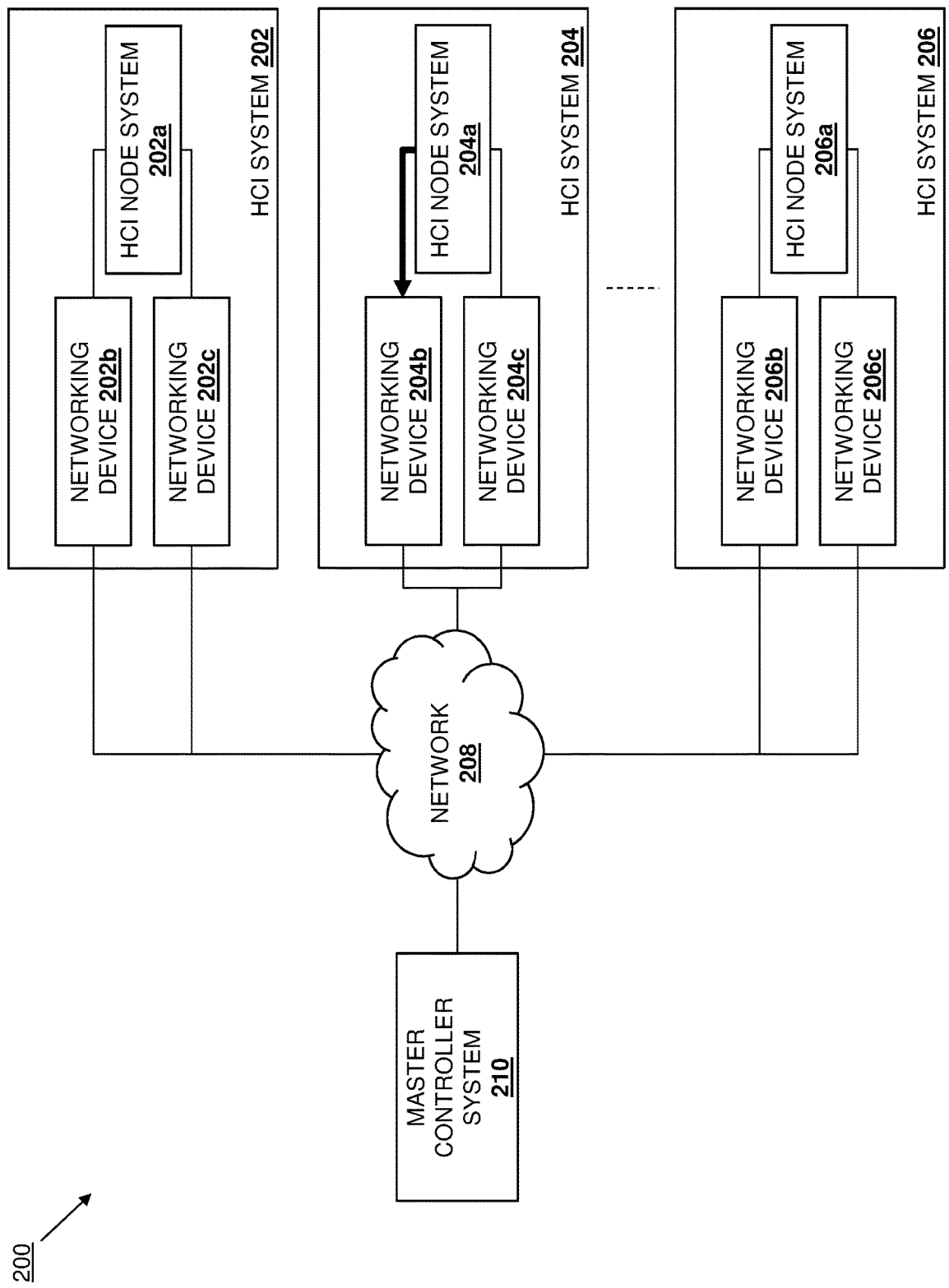
FIG. 5A is a schematic view illustrating an embodiment of the networking-device-based HCI edge controller system of FIG. 2 operating during the method of FIG. 4.

The method 400 then proceeds to block 404 where the networking device operating as the edge controller retrieves software/firmware inventory information for each HCI node component. As illustrated in FIG. 5A, in an embodiment of block 404, the edge controller engine 304 in the networking device 204a may operate to retrieve software/firmware inventory information for each of the HCI node devices discovered in the HCI system 204a at block 402. For example, for each HCI node device discovered at block 404, the edge controller engine 304 in the networking device 204a may perform inventory operations to identify each of the HCI components included in that HCI node device, and then generate inventory manifests that identify current software (e.g., firmware) utilized by each of the HCI components in that HCI node device. In a specific example, the edge controller engine 304 in the networking device 204a may communicate with the management subsystem provided for each HCI node device (e.g., via out-of-band communications (e.g., directly with an iDRAC) or in-band communications (e.g., via an iSM to the iDRAC) in substantially the same manner as discussed above) in order to perform the inventory operations that identify each HCI component/hardware included in those HCI node devices, the current software (e.g., firmware) utilized by those HCI components/hardware, and/or any other HCI node device information that would be apparent to one of skill in the art in possession of the present disclosure.

In some embodiments, the edge controller engine 304 in the networking device 204a may also operate to monitor a health status of the HCI system 204, the HCI node system 204a, the HCI node devices in the HCI node system 204a, and/or HCI components in the HCI node devices. For example, for each HCI node device discovered at block 404, the edge controller engine 304 in the networking device 204a may perform health monitoring operations to identify a health status of the HCI system 204, the HCI node system 204a, the HCI node devices in the HCI node system 204a, and/or HCI components in the HCI node devices. In a specific example, the edge controller engine 304 in the networking device 204a may communicate with the management subsystem provided for each HCI node device (e.g., via in-band communications (e.g., via an iSM to the iDRAC) in substantially the same manner as discussed above) in order to poll for the health status of the HCI system 204, the HCI node system 204a, the HCI node devices in the HCI node system 204a, and/or HCI components in the HCI node devices. In response to receiving a health status that is then determined to be outside a threshold, the edge controller engine 304 in the networking device 204a may log that health status; generate and transmit a health status report, warning, and/or other health communication; and/or perform a variety of other health status operations that would be apparent to one of skill in the art in possession of the present disclosure.

Figure 5B:
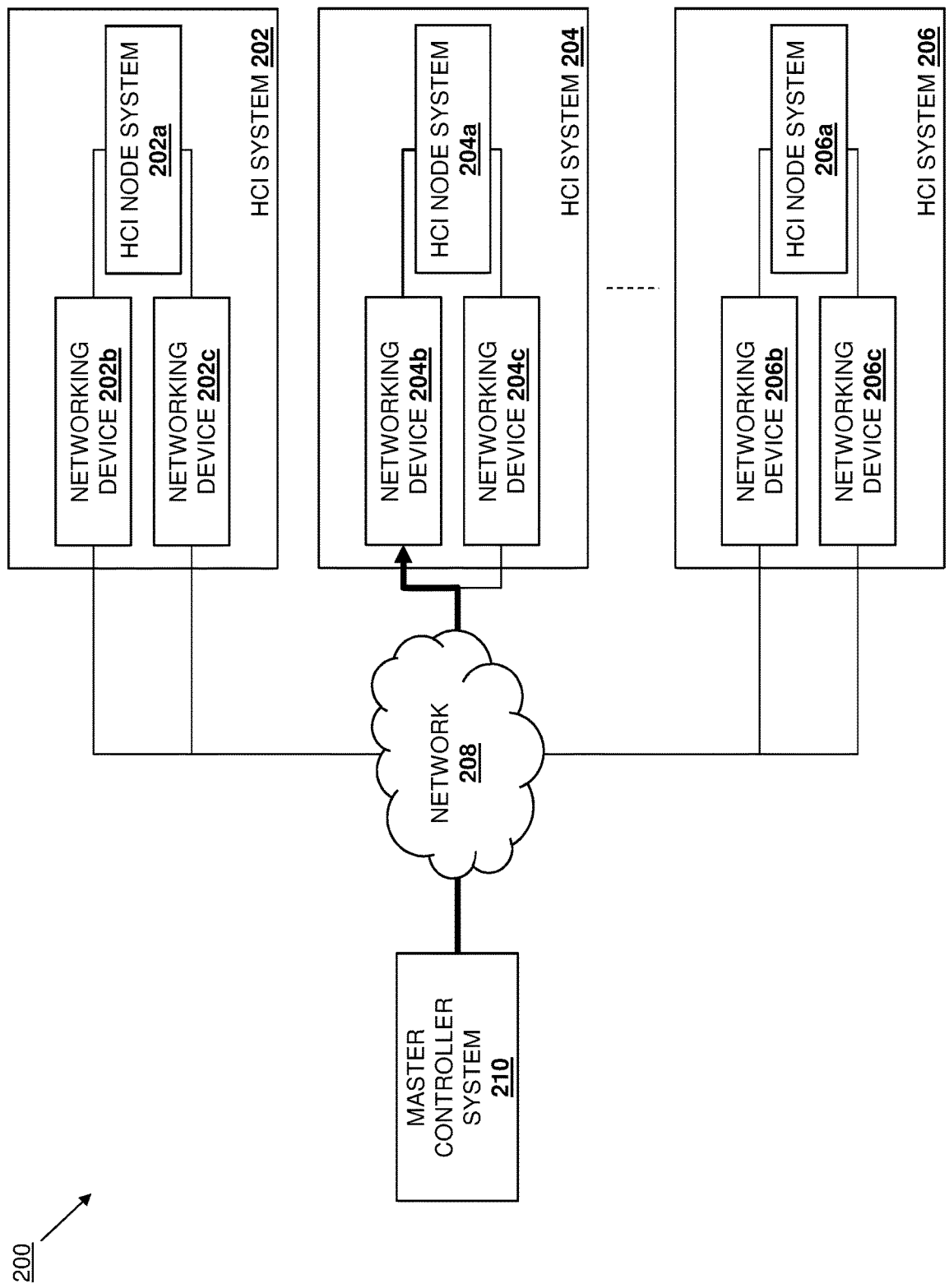
FIG. 5B is a schematic view illustrating an embodiment of the networking-device-based HCI edge controller system of FIG. 2 operating during the method of FIG. 4.

The method 400 then proceeds to block 406 where the networking device operating as the edge controller receives updated software/firmware from a master controller. With reference to FIG. 5B, in an embodiment of block 406, the edge controller engine 304 in the networking device 204a may operate to receive updated software (e.g., firmware) from the master controller system 210. Continuing with the example in which HCI node subsystems in an HCI system include substantially identify HCI components that do not change, the master controller system 210 may be configured to periodically provide software/firmware to each of those HCI systems, and the active edge controller provided in that HCI system (e.g., the edge controller engine 304 in the networking device 204b in the examples above) may receive those software/firmware updates and store them in a software/firmware repository provided in the edge controller database 306. As such, software/firmware repositories for each of those HCI systems (e.g., stored in the networking device in that HCI system that provides the active edge controller) may includes different versions of software/firmware utilized by that HCI system (e.g., a current version of the software/firmware (e.g., "N version" software/firmware) and one or more previous versions of the software/firmware (e.g., "N-1 version" software/firmware, "N-2 version" software/firmware, and so on).

Thus, the software/firmware update discussed as being received at block 406 of the method 400 may be received at any time during or before the method 400 while remaining within the scope of the present disclosure. As will be appreciated by one of skill in the art in possession of the present disclosure, storing several versions of the software/firmware allows the use of previous software/firmware versions (e.g., the "N-1 version" software/firmware) in the event there is a need to "back up" software/firmware provided for an HCI component/hardware to a previous version. However, as discussed below, the software/firmware update discussed as being received at block 406 may also be received later in the method 400 such as, for example, following the determination that software/firmware inventory information does not match the updated software/firmware for at least one HCI node component. Furthermore, in situations where multiple networking devices are utilized in each HCI system, the active edge controller in a first networking device may replicate any software/firmware update to a passive edge controller in a second networking device to provide redundant software/firmware repositories on each of the networking devices.

The method 400 then proceeds to block 408 where the networking device operating as the edge controller determines that software/firmware inventory information does not match the updated software/firmware for at least one HCI node component, and provides the updated software/firmware on those HCI node component(s). In some embodiments, at block 408, the edge controller engine 304 in the networking device 204a may operate to check the compliance of HCI component/hardware in any HCI node device in the HCI system 204 with the latest software/firmware available for those HCI components/hardware by comparing the current software (e.g., firmware) utilized by those HCI components/hardware with the software/firmware stored in the software/firmware repository discussed above, and determine whether the current software (e.g., firmware) utilized by those HCI components/hardware matches the current/"N version" software/firmware stored in the software/firmware repository in its edge controller database 306. In the event the current software (e.g., firmware) utilized by those HCI components/hardware does not match the current/"N version" software/firmware stored in the software/firmware repository, the edge controller engine 304 in the networking device 204a may operate to provide any of that current/"N version" software/firmware to the HCI components/hardware in the HCI node device of the HCI system 204 that were determined to be out of software/firmware compliance. For example, the edge controller engine 304 in the networking device 204a may operate to provide any of that current/"N version" software/firmware via out-of-band communications on an out-of-band channel with the management subsystem in the HCI system 204, and that management subsystem may apply that software/firmware to those HCI components/hardware using methods known in the art. In another example, the edge controller engine 304 in the networking device 204a may operate to provide any of that current/"N version" software/firmware via in-band communications with a service module and on an in-of-band channel with the management subsystem in the HCI system 204, and that management subsystem may apply that software/firmware to those HCI components/hardware using methods known in the art.

Figure 5C:
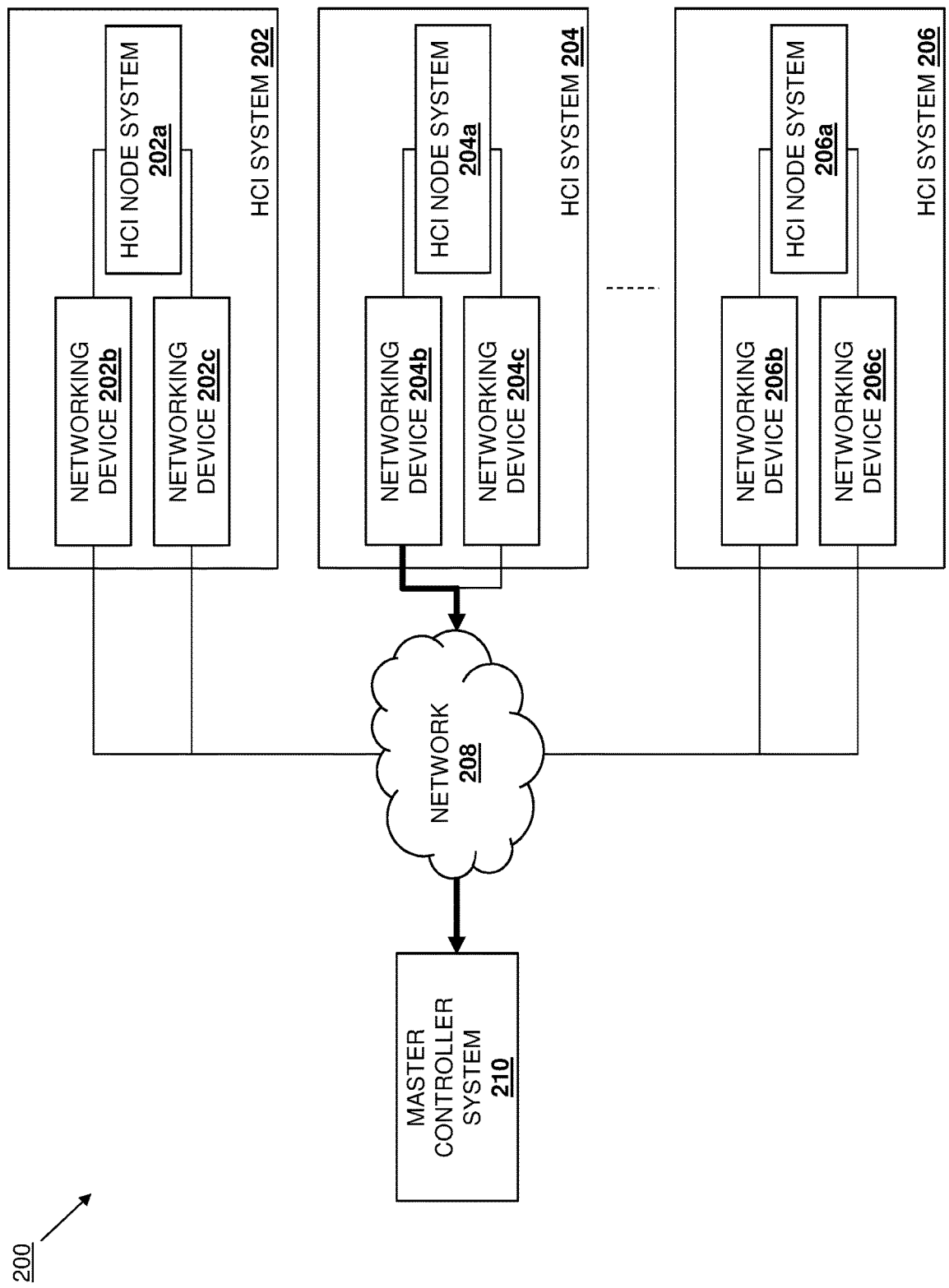
FIG. 5C is a schematic view illustrating an embodiment of the networking-device-based HCI edge controller system of FIG. 2 operating during the method of FIG. 4.

With reference to FIG. 5C, and continuing with the examples above in which the HCI node subsystems in an HCI system include different HCI node devices or flexible, non-appliance HCI node devices (e.g., vSAN-ready HCI node devices), the edge controller engine 304 in the networking device 204a may operate to transmit the inventory manifests, which identify the current software (e.g., firmware) utilized by each of the HCI components/hardware in the HCI node device(s), via the network 208 and to the master controller system 210. The master controller system 210 may then identify the HCI system/HCI node devices/HCI components/hardware, and check the inventory manifests against a master compliance list that details all the current software/firmware that should be utilized by the HCI components/hardware in the HCI node devices in the HCI system 204, and generate a custom software/firmware update package for the HCI system that includes software/firmware updates for each HCI component/hardware in the HCI system that is out of compliance with the current software/firmware. As will be appreciated by one of skill in the art in possession of the present disclosure, the generation of the custom software/firmware update packets by the master controller system 210 provides for efficient software/firmware updates for the HCI components/hardware in the HCI node devices in the HCI system 204 because it only includes software/firmware updates for HCI components/hardware that require those software/firmware updates.

Figure 5D:
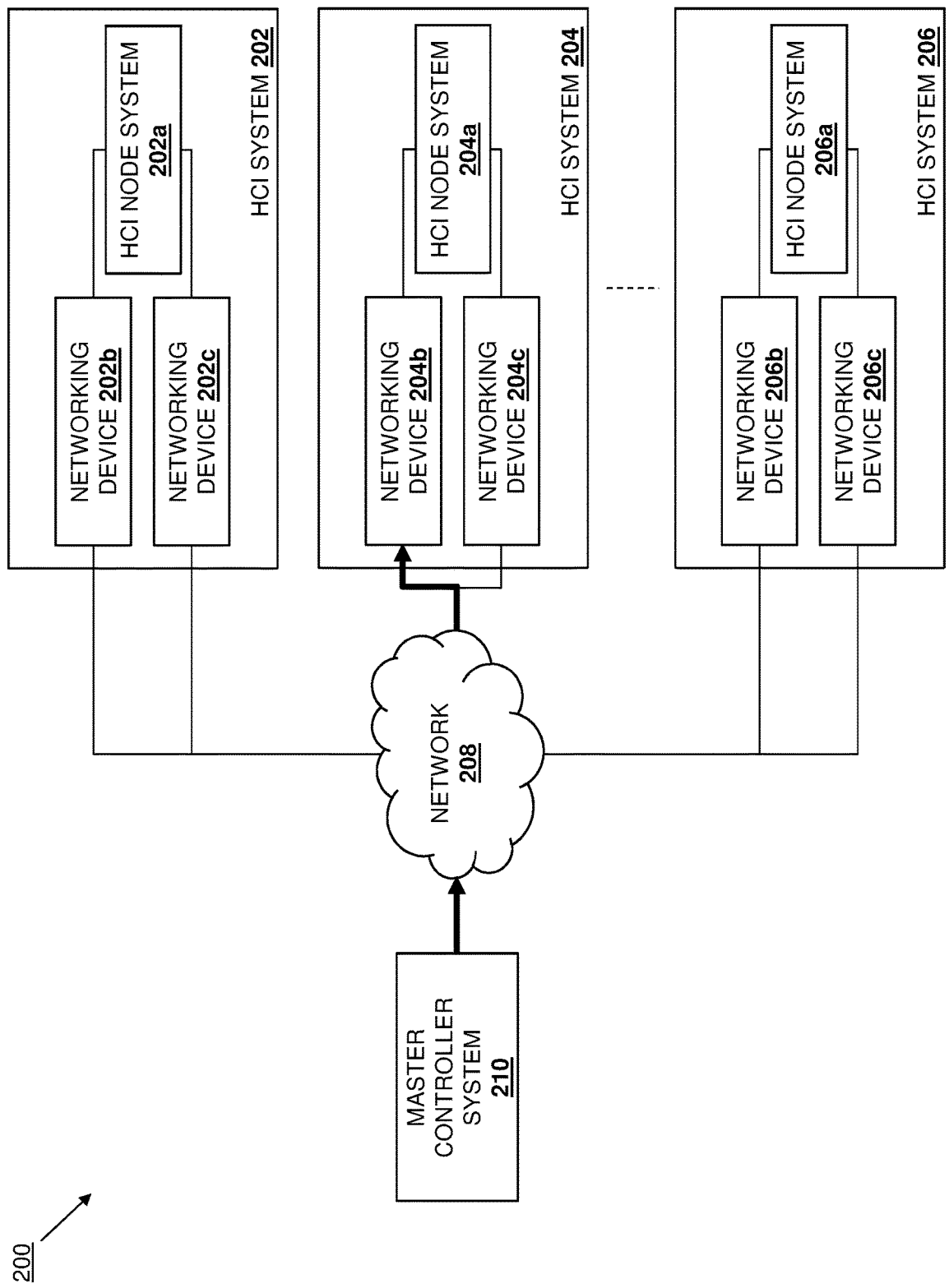
FIG. 5D is a schematic view illustrating an embodiment of the networking-device-based HCI edge controller system of FIG. 2 operating during the method of FIG. 4.
Figure 5E:
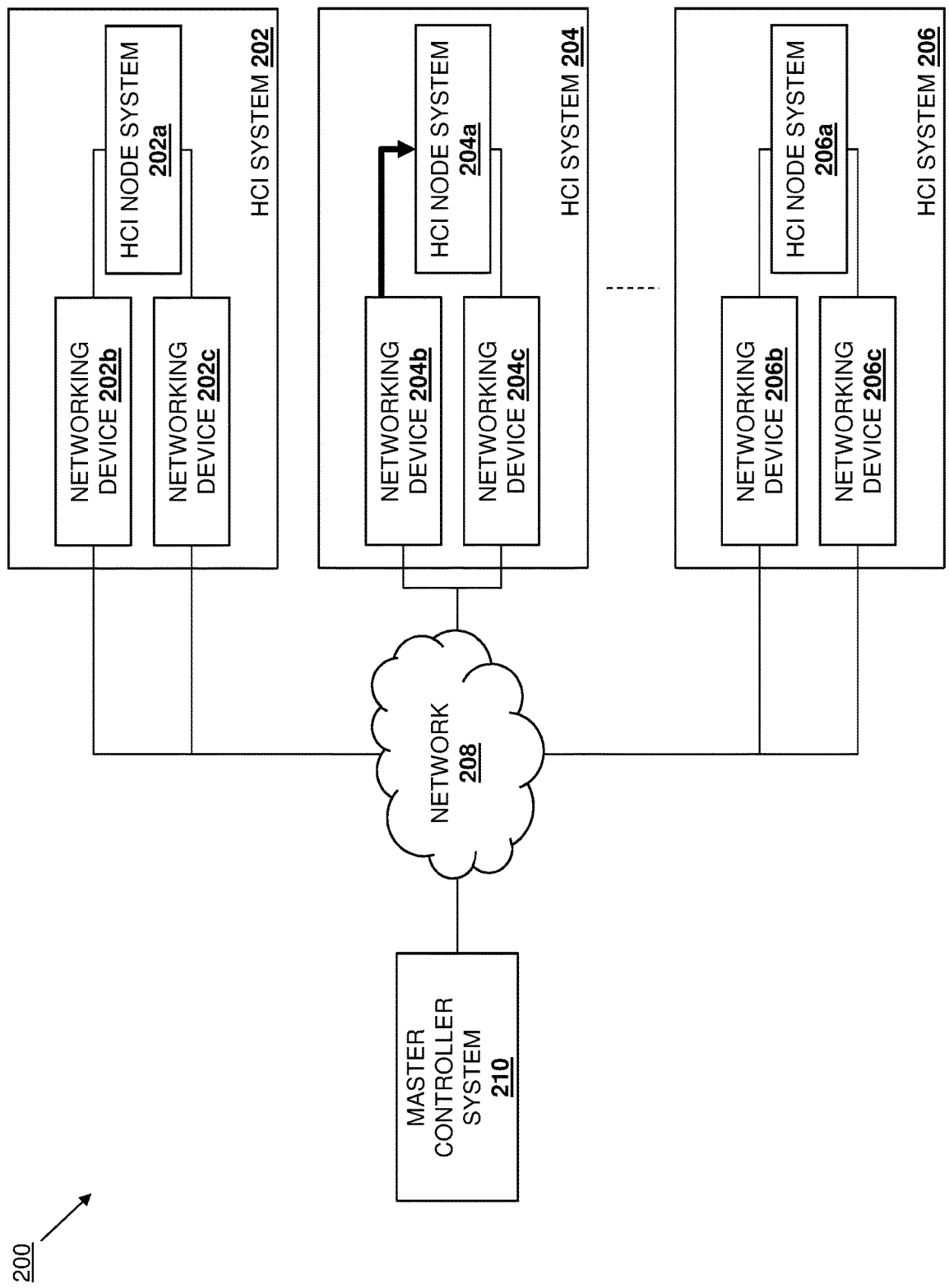
FIG. 5E is a schematic view illustrating an embodiment of the networking-device-based HCI edge controller system of FIG. 2 operating during the method of FIG. 4.

As illustrated in FIG. 5D, the master controller system 210 may then transmit that custom software/firmware update package to the networking device 204b such that it is received by the edge controller engine 304 in that the networking device 204b. As illustrated in FIG. 5E, the edge controller engine 304 in that the networking device 204b may then provide that custom software/firmware update package to the HCI node system 204a so that each HCI component/hardware in the HCI system that is out of compliance with current software/firmware may have its software/firmware updated (e.g., by the management subsystem in the HCI system 204 following a reboot of that HCI system 204, via a cluster-aware update mechanism, and/or in a variety of other manners that would be apparent to one of skill in the art in possession of the present disclosure.) As such, following block 408, the HCI components/hardware in the HCI node devices in the HCI system 204 may operate with updated software/firmware to perform any of a variety of edge HCI system functionality (including the transmission of data via a network that is enabled by conventional networking operations performed by the networking devices 204b and 204c) that would be apparent to one of skill in the art in possession of the present disclosure. Furthermore, while the method 400 has been discussed with regard to the HCI system 204, one of skill in the art in possession of the present disclosure will recognize that the HCI systems 202 and up to 206 may operate in a substantially similar manner while remaining within the scope of the present disclosure as well.

Thus, systems and methods have been described that provide an edge controller system in one or more switch devices provided with an edge HCI system, with the edge controller system operating in conjunction with a master controller system that is accessible via a network (e.g., in a datacenter, private cloud system, public cloud system, etc.) Edge controller systems provided for any edge HCI system may register with the master controller system during times when the two have network connectivity, but the network connectivity between the edge controller system and the master controller system need not be persistent, and in many embodiments may be intermittent. The master controller system manages the edge HCI systems and the compliance of HCI components in the edge HCI systems with HCI component updates via the edge controller system included in the switch device(s) provided with each edge HCI system. If an edge HCI system includes an HCI node system with identical HCI node devices, the master controller system may provide HCI component updates to the edge controller system, and the edge controller system may apply those HCI component updates. However, in examples in which an edge HCI system includes an HCI node system with different HCI node devices or flexible, non-appliance HCI node devices, then the edge controller system may provide the master controller system a manifest of the inventory of HCI node devices/HCI components/hardware in its HCI system, which allows the master controller system to provide HCI component updates to the edge controller system for only the HCI node devices/HCI components/hardware in its HCI system that need them, and those HCI component updates may then be applied by the edge controller system. As such, edge HCI system management is enabled without the additional management infrastructure needed with conventional edge HCI systems, reducing costs, maintenance, and other remote computing issues known in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking-device-based Hyper-Converged-Infrastructure (HCI) edge controller system, comprising:
    a master controller system;
    a Hyper-Converged-Infrastructure (HCI) node system including HCI nodes; and
    a first networking device coupled to the master controller system via a network and to the HCI node system locally, wherein the first networking device and the HCI node system are provided at an edge location in the network, and wherein the first networking device includes a first edge controller subsystem that is configured to:
        identify a plurality of HCI node components that are included in the HCI nodes in the HCI node system;
        if the HCI nodes are different or flexible, non-appliance HCI node devices, retrieve, from the HCI nodes in the HCI node system, respective software inventory information for each of the plurality of HCI node components to provide a manifest of the respective software inventory information to the master controller system;
        receive, from the master controller system via the network, first updated software, wherein if the HCI nodes are identical and do not change, HCI component updates that include the first updated software are periodically received by the first edge controller from the master controller system;
        determine that the respective software inventory information for at least one of the plurality of HCI node components does not comply with the first updated software for that at least one of the plurality of HCI node components; and
        in response to the determination, provide the first updated software on that at least one of the plurality of HCI node components to cause that at least one of the plurality of HCI node components to update using the first updated software.

2. The system of claim 1, wherein the first edge controller subsystem included on the first networking device is configured to:
    intermittently connect to and communicate with the master controller system via the network.

3. The system of claim 1, wherein the first edge controller subsystem included on the first networking device is configured to:
    identify, to the master controller system via the network, the plurality of HCI node components; and
    receive, from the master controller system via the network, the first updated software for a subset of the plurality of HCI node components that are associated with software inventory information that does not comply with the first updated software.

4. The system of claim 1, wherein the first networking device is configured to:
    perform networking operations to enable communications between at least one device that is connected to the network and the HCI node system.

5. The system of claim 1, wherein the HCI node system includes a plurality of identical HCI nodes, and wherein the first software update is received automatically from the master controller system and is configured to provide a software update for each of the plurality of identical HCI nodes.

6. The system of claim 1, wherein the first edge controller subsystem included in the first networking device provides an active edge controller subsystem, and wherein the system further comprises: a second networking device coupled to the master controller system and the HCI node system, wherein the second networking device and the HCI node system are provided at the edge location in a network, and wherein the second networking device includes a second edge controller subsystem that provides a passive edge controller subsystem that is configured to: identify the plurality of HCI node components that are included in the HCI nodes in the HCI node system; retrieve, from the HCI nodes in the HCI node system, the respective software inventory information for each of the plurality of HCI node components; receive the first updated software from the master controller system; and determine that the respective software inventory information for at least one of the plurality of HCI node components does not comply with the first updated software for that at least one of the plurality of HCI node components and, in response, provide the first updated software on that at least one of the plurality of HCI node components.

7. An Information Handling System (IHS), comprising:
a networking processing system; and
a networking memory system that is coupled to the networking processing system and that includes instructions that, when executed by the networking processing system, cause the networking processing system to provide an edge controller engine that is configured to:
identify a plurality of Hyper-Converged-Infrastructure (HCI) node components that are included in HCI nodes in an HCI node system that is coupled to the networking processing system locally, wherein the networking processing system and the HCI node system are provided at an edge location in a network that couples the networking processing system and a master controller system;
if the HCI nodes are different or flexible, non-appliance HCI node devices, retrieve, from the HCI nodes in the HCI node system, respective software inventory information for each of the plurality of HCI node components to provide a manifest of the respective software inventory information to the master controller system;
receive, from the master controller system via the network, first updated software, wherein if the HCI nodes are identical and do not change, HCI component updates that include the first updated software are periodically received by the first edge controller from the master controller system;
determine that the respective software inventory information for at least one of the plurality of HCI node components does not comply with the first updated software for that at least one of the plurality of HCI node components; and
in response to the determination, provide the first updated software on that at least one of the plurality of HCI node components to cause that at least one of the plurality of HCI node components to update using the first updated software.

8. The IHS of claim 7, wherein the edge controller engine is configured to:
intermittently connect to and communicate with the master controller system via the network.

9. The IHS of claim 7, wherein the edge controller engine is configured to:
identify, to the master controller system via the network, the plurality of HCI node components; and
receive, from the master controller system via the network, the first updated software for a subset of the plurality of HCI node components that are associated with software inventory information that does not comply with the first updated software.

10. The IHS of claim 7, wherein the networking memory system includes instructions that, when executed by the networking processing system, cause the networking processing system to provide a networking engine that is configured to:
perform networking operations to enable communications between at least one device that is connected to the network and the HCI node system.

11. The IHS of claim 7, wherein the HCI node system includes a plurality of identical HCI nodes, and wherein the first software update is received automatically from the master controller system and is configured to provide a software update for each of the plurality of identical HCI nodes.

12. The IHS of claim 7, wherein the edge controller engine is configured to operate as one of an active edge controller engine or a passive edge controller engine.

13. The IHS of claim 7, wherein the edge controller engine is configured to: monitor a health status of the at least one HO node in the HO node system; and provide, for display on a display device, the health status monitored for the at least one HO node in the HO node system.

14. A method for providing networking-device-based edge control of a Hyper-Converged Infrastructure (HCI) system, comprising:
identifying, by a first networking device operating as an edge controller, a plurality of HCI node components that are included in HCI nodes in an HCI node system that is coupled to the first networking device locally, wherein the first networking device and the HCI node system are provided at an edge location in a network that couples the first networking device and a master controller system;
if the HCI nodes are different or flexible, non-appliance HCI node devices, retrieving, by the first networking device operating as the edge controller from the HCI nodes in the HCI node system, respective software inventory information for each of the plurality of HCI node components to provide a manifest of the respective software inventory information to the master controller system;
receiving, by the first networking device operating as the edge controller from the master controller system via the network, first updated software, wherein if the HCI nodes are identical and do not change, HCI component updates that include the first updated software are periodically received by the first edge controller from the master controller system;
determining, by the first networking device operating as the edge controller, that the respective software inventory information for at least one of the plurality of HCI node components does not comply with the first updated software for that at least one of the plurality of HCI node components; and
in response to the determination, providing the first updated software on that at least one of the plurality of HCI node components to cause that at least one of the plurality of HCI node components to update using the first updated software.

15. The method of claim 14, further comprising:
intermittently connecting to and communicating, by the first networking device operating as the edge controller, with the master controller system via the network.

16. The method of claim 14, further comprising:
identifying, by the first networking device operating as the edge controller to the master controller system via the network, the plurality of HCI node components; and
receiving, by the first networking device operating as the edge controller from the master controller system via the network, the first updated software for a subset of the plurality of HCI node components that are associated with software inventory information that does not comply with the first updated software.

17. The method of claim 14, further comprising:
performing, by the first networking device, networking operations to enable communications between at least one device that is connected to the network and the HCI node system.

18. The method of claim 14, wherein the HCI node system includes a plurality of identical HCI nodes, and wherein the first software update is received automatically from the master controller system and is configured to provide a software update for each of the plurality of identical HCI nodes.

19. The method of claim 14, wherein the first networking device is configured to operate as one of an active edge controller with a second networking device operating as a passive edge controller.

20. The method of claim 14, further comprising: monitoring, by the first networking device operating as the edge controller, a health status of the HCI nodes in the HO node system and providing, by the first networking device operating as the edge controller for display on a display device, the health status monitored for the HCI nodes in the HO node system.

* * * * *

UNITED STATES PATENT AND TRADEMARK OFFICE
CERTIFICATE OF CORRECTION

PATENT NO.       : 11,099,827 B2
APPLICATION NO.  : 16/653637
DATED            : August 24, 2021
INVENTOR(S)      : Rizwan Ali et al.

Page 1 of 1

It is certified that error appears in the above-identified patent and that said Letters Patent is hereby corrected as shown below:

In the Claims

Claim 13, Column 14, Lines 26 and 28, "HO", each occurrence, should be changed to --HCl--;

Claim 20, Column 16, Lines 14 and 17, "HO", each occurrence, should be changed to --HCl--.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*